US006808807B2

(12) United States Patent
Anand et al.

(10) Patent No.: US 6,808,807 B2
(45) Date of Patent: Oct. 26, 2004

(54) COATED FERROMAGNETIC PARTICLES AND COMPOSITE MAGNETIC ARTICLES THEREOF

(75) Inventors: Krishnamurthy Anand, Bangalore (IN); Gerald Burt Kliman, Niskayna, NY (US); Luana Emiliana Iorio, Clifton Park, NY (US); Suchismita Sanyal, Bangalore (IN); Amitabh Verma, Bangalore (IN); Kanchan Kumari, Bangalore (IN); Srinidhi Sampath, Bangalore (IN)

(73) Assignee: General Electric Company, Niskayuna, NY (US)

( * ) Notice: Subject to any disclaimer, the term of this patent is extended or adjusted under 35 U.S.C. 154(b) by 215 days.

(21) Appl. No.: 10/064,152

(22) Filed: Jun. 14, 2002

(65) Prior Publication Data

US 2003/0232196 A1 Dec. 18, 2003

(51) Int. Cl.$^{7}$ .................................................. B32B 5/16

(52) U.S. Cl. ....................... 428/403; 428/407; 428/520; 148/31.55; 148/104; 148/105; 75/234; 75/246; 427/127; 427/212; 427/213.31; 427/213.32

(58) Field of Search ................................. 428/403, 407, 428/520; 148/31.55, 104, 105; 427/127, 212, 213.31, 213.32; 75/234, 246

(56) References Cited

U.S. PATENT DOCUMENTS 3,725,521 A 4/1973 Ebling
4,601,753 A * 7/1986 Soileau et al. .............. 428/404
4,601,765 A 7/1986 Soileau et al.
5,543,174 A 8/1996 Rutz
5,591,373 A 1/1997 Ward et al.
5,651,841 A 7/1997 Moro et al.
5,798,177 A 8/1998 Jansson
6,193,903 B1 2/2001 Gay et al.
6,251,514 B1 6/2001 Lashmore et al.
6,309,748 B1 10/2001 Lashmore et al.

* cited by examiner

*Primary Examiner*—Leszek Kiliman
(74) *Attorney, Agent, or Firm*—Toan P. Vo; Patrick K. Patnode

(57) ABSTRACT

A coated ferromagnetic particle comprises a ferromagnetic core and a coating. The coating comprises a residue resulting from a thermal treatment of a coating material comprising a polymer selected from the group consisting of polyorganosiloxanes, polyorganosilanes, and mixtures thereof. A composite magnetic article comprises a compacted and annealed article of a desired shape. The composite magnetic article comprises a plurality of coated ferromagnetic articles. Each coated ferromagnetic particle comprises a ferromagnetic core and a coating. The coating comprises a residue resulting from a thermal treatment of a coating material comprising a polymer selected from the group consisting of polyorganosiloxanes, polyorganosilanes, and mixtures thereof.

38 Claims, 2 Drawing Sheets

COATED FERROMAGNETIC PARTICLES AND COMPOSITE MAGNETIC ARTICLES THEREOF

BACKGROUND OF INVENTION

The present invention relates generally to soft magnetic materials. In particular, the present invention relates generally to soft magnetic materials used in various electromagnetic devices. More particularly, the invention relates to soft magnetic materials and composite magnetic articles made of coated ferromagnetic particles.

Magnetic materials fall generally into two classes, hard magnetic materials which may be permanently magnetized, and soft magnetic materials whose magnetization may be reversed. The present invention relates to the latter class of materials. The magnetic permeability and core loss characteristics are important properties of soft magnetic materials in electromagnetic applications. Magnetic permeability is a measure of the ease with which a magnetic substance may be magnetized and is an indication of the ability of the material to carry a magnetic flux. Magnetic permeability is defined as the ratio of the induced magnetic flux to the magnetizing force or the magnetic field intensity. The exposure of a magnetic material to a rapidly varying field results in an energy loss in the magnetic core of the material, which energy loss is known as the core loss. Core loss is divided into two categories, hysteresis loss and eddy current loss. The hysteresis loss results from the expenditure of energy to overcome the retained magnetic forces in the magnetic core. The eddy current loss results from the flow of electric currents within the magnetic core induced by the changing flux.

Conventional electromagnetic devices use magnetic core articles made using laminated structures. Laminated cores are typically made by stacking thin ferrous sheets which are oriented parallel to the magnetic field to provide low reluctance. The sheets may be coated to provide insulation and prevent current from circulating between sheets. Such insulation results in a reduction in the eddy current loss. The fabrication of laminated cores involves many operations which contribute to increased expense. The application of laminated cores is limited by the need to carry magnetic flux in the plane of the sheet to avoid excessive eddy current losses. The fabrication of three-dimensional configurations using the lamination process is expensive and complex. Laminated cores experience large core losses at high frequencies and are acoustically noisy as the laminations have a tendency to vibrate. The use of sintered and coated ferromagnetic powders for making magnetic core articles allows greater variation in the geometry of the component and avoids the manufacturing burden inherent in laminated cores. However, magnetic core articles made using sintered ferromagnetic powders experience high core losses and typically have been restricted to applications involving DC operation.

The use of encapsulated ferromagnetic powders to make magnetic core articles has been and continues to be a subject of research. The encapsulation provides an electrical insulation for individual ferromagnetic particles to reduce eddy current losses and may also serve as a binder or a lubricant. The desired properties in magnetic core articles made using encapsulated ferromagnetic powders include high density, high permeability, low core losses, high transverse rupture strength, and suitability for compaction molding techniques. Various attempts have been made to form magnetic core articles using encapsulated ferromagnetic powders. Several types of encapsulating materials and encapsulating methods have been used. Inorganic encapsulating materials such as iron phosphate, iron chromate, iron oxides and boron nitride have been suggested. Certain organic encapsulating materials have also been used. Doubly encapsulated ferromagnetic powders have also been suggested for making magnetic core articles. Encapsulating materials made by blending different materials have also been suggested.

The encapsulated ferromagnetic powders are compacted into a magnetic core article. Following compaction, the properties of magnetic core articles, made using such encapsulating materials and the suggested encapsulating methods, such as the permeability and core losses are less than desired particularly at low frequency operation. Annealing the magnetic core article can result in increased permeability and lower core loss. Annealing relieves residual stresses caused by compaction of the encapsulated ferromagnetic powders. These residual stresses degrade magnetic properties such as permeability and core loss characteristics. In order to achieve an effective anneal and substantially relieve the residual stress, the article is maintained at a temperature typically in excess of 600° C. for a duration that depends on the extent of residual stress present. However, a temperature approaching 600° C. causes most organic encapsulating materials to degrade, decompose, or pyrolyze. This impairs the ability of the encapsulating material to electrically insulate the ferromagnetic powders and results in degradation of the permeability, core loss, and mechanical integrity of the magnetic core article.

Therefore, there exists a continued need to produce coated ferromagnetic particles and magnetic articles comprising coated ferromagnetic particles having high permeability and low core loss characteristics in a cost effective manner.

SUMMARY OF INVENTION

An embodiment of the present invention provides a coated ferromagnetic particle. A coated ferromagnetic particle in accordance with one embodiment of the invention comprises a ferromagnetic core and a coating. The coating comprises a residue resulting from a thermal treatment of a coating material comprising a polymer selected from the group consisting of polyorganosiloxanes, polyorganosilanes, and mixtures thereof.

Another embodiment of the invention provides a composite magnetic article comprising a compacted and annealed article of a desired shape. The composite magnetic article comprises a plurality of coated ferromagnetic particles. Each coated ferromagnetic particle comprises a ferromagnetic core and a coating. The coating comprises a residue resulting from a thermal treatment of a coating material comprising a polymer selected from the group consisting of polyorganosiloxanes, polyorganosilanes, and mixtures thereof.

In another embodiment of the present invention, a method for making a coated ferromagnetic particle comprises the steps of: (a) providing an uncoated ferromagnetic core; (b) providing a coating material comprising a polymer selected from the group consisting of polyorganosiloxanes, polyorganosilanes, and mixtures thereof; (c) encapsulating the uncoated ferromagnetic core with the coating material comprising the polymer; and (d) thermally treating the coating material so as to convert the coating material into a residue.

Still another embodiment of the present invention provides a method for producing a composite magnetic article.

The method for producing a composite magnetic article comprises the steps of: (a) providing uncoated ferromagnetic particles; (b) providing a coating material comprising a polymer selected from the group consisting of polyorganosiloxanes, polyorganosilanes, and mixtures thereof; (c) encapsulating each of the uncoated ferromagnetic particles with the coating material to produce encapsulated ferromagnetic particles; (d) subjecting the encapsulated ferromagnetic particles to a compaction to form a compact of a desired shape; and (e) subjecting the compact to an annealing treatment. The composite magnetic article comprises a plurality of coated ferromagnetic particles. Each of the coated ferromagnetic particles comprises a ferromagnetic core and a coating. The coating comprises a residue resulting from the thermal treatment of a coating material comprising a polymer selected from the group consisting of polyorganosiloxanes, polyorganosilanes, and mixtures thereof.

According to another aspect of the invention, a device using electromagnetic materials comprises a composite magnetic article.

These and other features, aspects, and advantages of the present invention will become better understood with reference to the following description, appended claims, and accompanying drawings in which like characters represent like parts throughout the drawings.

DETAILED DESCRIPTION

Figure 1:
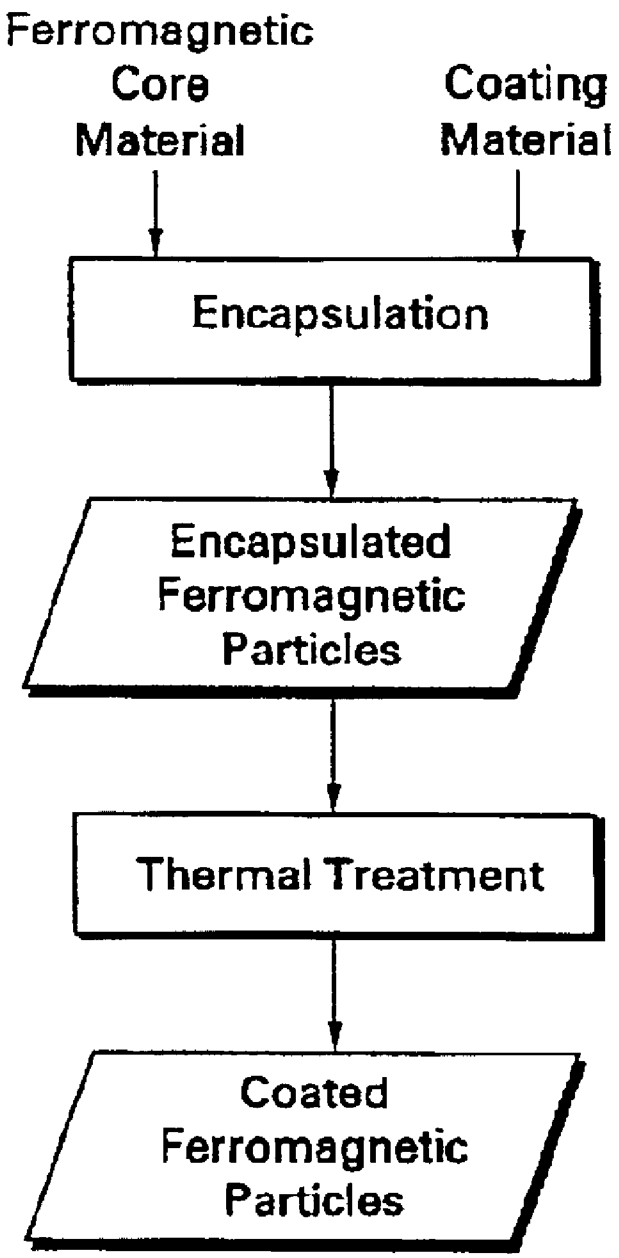
FIG. 1 is a block diagram illustrating an embodiment of a method for making a coated ferromagnetic particle in accordance with one aspect of the present invention.
Figure 2:
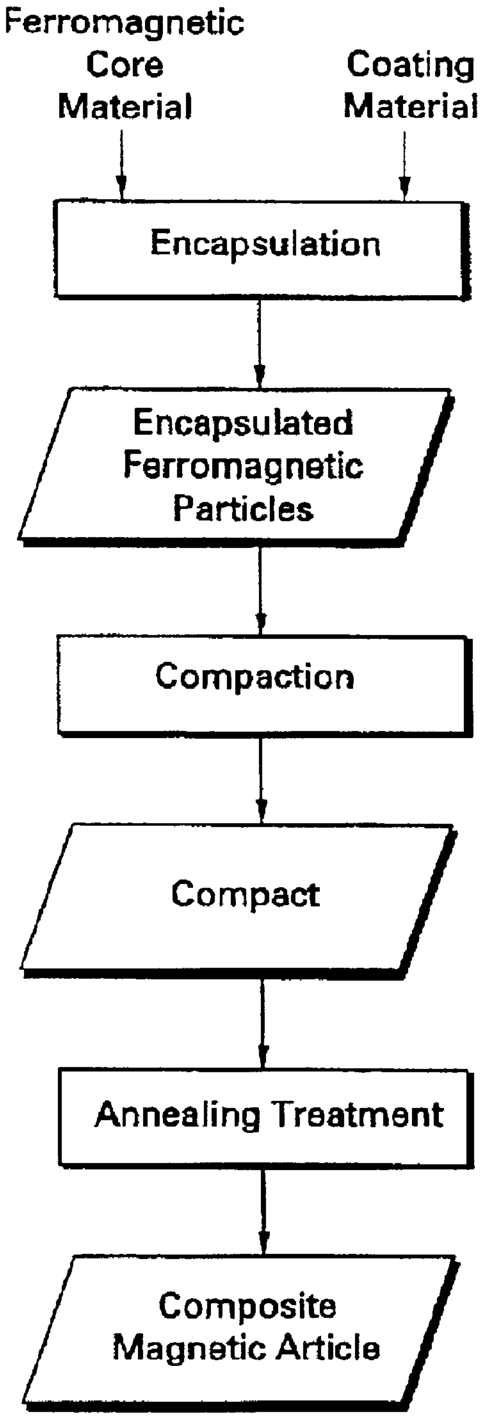
FIG. 2 is a block diagram illustrating an embodiment of a method for producing a composite magnetic article in accordance with one aspect of the present invention.

A coated ferromagnetic particle of the present invention comprises a ferromagnetic core and a coating. The coating on the ferromagnetic core comprises a residue resulting from a thermal treatment of a coating material comprising a polymer selected from the group consisting of polyorganosiloxanes, polyorganosilanes, and mixtures thereof. A ferromagnetic core is encapsulated with a coating material comprising the polymer to form an encapsulated ferromagnetic particle. The encapsulated ferromagnetic particle is subjected to a thermal treatment to produce a coated ferromagnetic particle. The thermal treatment is performed at a temperature that is at or above the decomposition temperature of the polymer and results in a coating comprising a residue of the coating material. The encapsulation process and the thermal treatment are described below.

Iron, either in crystalline or amorphous form, can be used as a ferromagnetic core material. In a certain embodiment of the invention, the ferromagnetic core material comprises iron alloyed with elements such as, but not limited to, silicon, aluminum, nickel, cobalt, boron, phosphorus, zirconium, neodymium, and carbon. The choice of one or more alloying elements depends on the desired mechanical, electrical, and magnetic properties in a ferromagnetic core. In an embodiment of the invention, the ferromagnetic core is amorphous and is in a ribbon or flake form. Amorphous iron and iron alloys are produced by numerous techniques. A non-limiting example is rapid solidification by melt spinning.

In one embodiment of the invention, the ferromagnetic core is in a powder form. Although, there are numerous methods to produce crystalline ferromagnetic powders, suitable methods include gas atomization or water atomization. In one embodiment of the invention, size reduction or classification of the atomized powders may be performed on the powders to obtain the desired size range. At least about 99 weight percent of the ferromagnetic core particles pass through a U.S. standard No. 10 mesh, which has a nominal sieve opening of about 2 mm. An average diameter of the particles is determined from a sieve analysis. The sieve analysis provides a weight fraction of particles retained on each sieve used. The size of the particles retained on a particular sieve is taken to be the average of the nominal sieve opening of the particular sieve and the nominal sieve opening of a sieve that precedes the particular sieve. The average diameter of the ferromagnetic core particles is then determined from a weighted average computed using the weight fraction of particles retained on various sieves and the size of particles on those sieves. Ferromagnetic core particles with an average diameter less than 2 millimeter are suitable. In one embodiment of the invention, the ferromagnetic core particles have an average diameter in the range from about 10 micrometers to about 1 millimeter.

The coating material comprises a polymer that forms a residue when subjected to a thermal treatment. Suitable coating materials include polymers selected from a group consisting of polyorganosiloxanes, polyorganosilanes, and mixtures thereof. Examples of polyorganosiloxanes include compounds having a basic structure represented by the formulae $(RSiO_{1.5})_n$, $(R_1R_2SiO)_n$, and $(R_1R_2R_3SiO_{0.5})'_n$ where R, $R_1$, $R_2$, and $R_3$ represent alkyl, aryl, alkoxy, and aryloxy groups and n is an integer greater than or equal to 2. Silicone polymers including silicone homopolymers, silicone random copolymers, and silicone block copolymers are examples of suitable polyorganosiloxane materials. Polymethylsilsesquioxane, represented by the basic structure $(CH_3SiO_{1.5})_n$, is an example of a suitable polyorganosiloxane. The general structure for polydimethylsilicone and hexamethyldisiloxane, examples of suitable polyorganosiloxane, is illustrated below.

[t1]

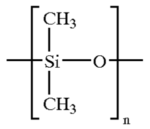

Polydimethylsilicone

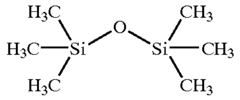

Hexamethyldisiloxane

Examples of polyorganosilanes include compounds having a basic structure represented by the formula $(R_1R_2Si)_n$ where $R_1$ and $R_2$ represent alkyl, aryl, alkoxy, and aryloxy groups and n is an integer greater than or equal to 2. Polyorganosiloxanes and polyorganosilanes decompose when subjected to high temperatures. Certain polyorganosiloxanes begin to decompose at temperatures above 250° C. and organic radicals are driven off. The residue from a thermal treatment of polyorganosiloxanes comprises Si and O. Carbon may also be present depending on the temperature and atmosphere of the thermal treatment. The residue from a thermal treatment of polyorganosilanes comprises Si and C. Oxygen may also be present in the residue depending on the composition of the polyorganosilane and the temperature and atmosphere of the thermal treatment.

The polymer is typically in solid or liquid form. In one embodiment of the invention, the polymer is dissolved in an appropriate solvent. In general, solvents such as alcohols, straight or branched aliphatic or cyclic hydrocarbons in liquid phase, and liquid-phase aromatic hydrocarbons (such as toluene, benzene, and xylene) are used. In one embodiment of the invention, filler materials are added to the coating material. Fillers are added to provide increased strength and to promote adhesion. Examples for filler materials include finely divided silicas prepared by vapor phase hydrolysis or oxidation of chlorosilanes, dehydrated silica gels, precipitated silicas, diatomaceous silicas, and finely ground high assay natural silicas. Other examples of filler materials include titania, zirconia, alumina, iron oxides, silicates, and aluminates.

The ferromagnetic core material is encapsulated with a coating material comprising a polymer selected from the group consisting of polyorganosiloxanes, polyorganosilanes, and mixtures thereof using one of several processes. These processes include fluidized bed coating, spray coating, dip coating, and precipitation coating. In an example of the dip coating process, the coating material is dissolved in a suitable solvent such as xylene or toluene to form a solution. The ferromagnetic core material, in powder form, is dipped into the solution and the mixture is agitated. The solvent is typically evaporated during an encapsulation treatment. The encapsulation treatment is performed at or near room temperature or at an elevated temperature. In most instances, a temperature less than about 200° C. is adequate to vaporize the solvent. In one embodiment of the invention, a vacuum is also applied in the encapsulation treatment. Evaporation of the solvent from the mixture produces encapsulated ferromagnetic particles.

Thermal treatment of encapsulated ferromagnetic particles is typically performed in a tray oven, fluidized bed apparatus, or a high temperature furnace. The thermal treatment may be desirably accompanied by agitation of the particles. In one embodiment of the invention, the thermal treatment is carried out in an inert atmosphere such as an argon or nitrogen atmosphere. In another embodiment of the invention, the thermal treatment is performed in a reactive atmosphere such as air. The thermal treatment comprises subjecting encapsulated ferromagnetic particles to a thermal treatment temperature that is at or above the decomposition temperature of the coating material. The thermal treatment temperature is selected depending on the type of polymer chosen as the coating material. In general, the thermal treatment is performed at a thermal treatment temperature greater than about 250° C. In one embodiment of the invention, the thermal treatment is performed at a thermal treatment temperature greater than about 400° C. In a specific embodiment of the invention, the thermal treatment is performed at a thermal treatment temperature that is in range from about 450° C. and about 950° C. The encapsulated ferromagnetic particle is held at the thermal treatment temperature for between about one minute and about ten hours. During the thermal treatment, the coating material comprising the polymer decomposes and alkyl, aryl, alkoxy, aryloxy and other organic radicals are driven away from the polymer leaving behind a coated ferromagnetic particle with a coating comprising Si and O if the polymer is a polyorganosiloxane or Si and C if the polymer is a polyorganosilane.

A composite magnetic article of the present invention comprises a plurality of coated ferromagnetic particles. Each of the coated ferromagnetic particles comprises a ferromagnetic core and a coating. The coating comprises a residue resulting from a thermal treatment of a coating material comprising a polymer selected from the group consisting of polyorganosiloxanes, polyorganosilanes, and mixtures thereof. A ferromagnetic core is encapsulated with the coating material to form an encapsulated ferromagnetic particle. A plurality of encapsulated ferromagnetic particles is subjected to a compaction to form a compact of a desired shape. The compact is subjected to an annealing treatment to produce a composite magnetic article. The compaction process and the annealing treatment are described below.

A plurality of encapsulated ferromagnetic particles is subjected to a compaction using any suitable technique to produce a compact of a desired shape. Suitable compaction techniques include uniaxial compaction, isostatic compaction, injection molding, extrusion, and hot isostatic pressing. A low compaction pressure results in a poor density of the compact. A high compaction pressure results in excessive residual stresses being induced in the compact. A suitable range for compaction pressure is from about 250 MPa (million Pascals) to about 1300 MPa. The density of the composite magnetic article is desirably greater than about 90 percent of the true density of the ferromagnetic core material. Defects such as pores in the composite magnetic article affect the transport of magnetic flux and, therefore, reduce permeability. A decrease in the porosity increases the density of the compact and results in an increase in the permeability. During the compaction process, stresses are introduced into the encapsulated ferromagnetic particles, which are subsequently relieved by subjecting the compact to a high temperature annealing treatment.

The annealing treatment is typically performed in a tray oven, fluidized bed apparatus, or a high temperature furnace. In one embodiment of the invention, the annealing treatment is carried out in an inert atmosphere such as a nitrogen or argon atmosphere. In another embodiment of the invention, the annealing treatment is performed in a reactive atmosphere such as air. The annealing treatment comprises subjecting the compact to an annealing temperature that is at or above the decomposition temperature of the coating material. The annealing temperature is selected depending on the type of polymer chosen as the coating material. The annealing treatment is performed at an annealing temperature greater than about 250° C. In one embodiment of the invention, the annealing treatment is performed at an annealing temperature greater than about 400° C. In a specific embodiment of the invention, the annealing treatment is performed at an annealing temperature that is in range from about 450° C. to about 950° C. The compact is held at the annealing temperature for between about one minute and about ten hours. During the annealing treatment, the polymer decomposes and alkyl, aryl, and other organic radicals are driven away from the polymer leaving behind a composite magnetic article comprising a plurality of coated ferromagnetic particles wherein each coated ferromagnetic particle has a coating comprising Si and O if the polymer is a polyorganosiloxane or Si and C if the polymer is a polyorganosilane.

In another embodiment of the invention, the compact is subjected to an annealing treatment that comprises a first annealing treatment and a second annealing treatment. The first annealing treatment is performed at a temperature or in a range of temperatures greater than about 250° C. for a first annealing time ranging from about one minute to about ten hours. In a specific embodiment of the invention, the first annealing treatment is performed in the temperature range from about 450° C. to about 950° C. for a first annealing time ranging from about one minute to about ten hours. The second annealing treatment is performed at a temperature or in a range of temperatures greater than about 250° C. for a second annealing time greater than about one minute. In one embodiment of the invention, the second annealing treatment is performed in the temperature range from about 300° C. to about 600° C. for a second annealing time greater than about one minute. The second annealing time is dependent on the desired properties of the composite magnetic article and may be longer than about 24 hours. Relevant properties include, but are not limited to, permeability and core loss. The extent and magnitude of the residual stresses present in the compact also have a bearing on the second annealing time.

In another embodiment of the invention, the compact is subjected to a decomposition treatment prior to annealing. The decomposition treatment is performed at a temperature that is at or above the decomposition temperature of the polymer coating material. The decomposition treatment temperature is greater than about 250° C. The decomposition treatment lasts for a duration that is sufficient for the polymer coating material to decompose to a residue comprising Si and O if the polymer is a polyorganosiloxane or Si and C if the polymer is a polyorganosilane. The compact is held at the decomposition temperature for a period in excess of one minute.

The coating coverage and coating thickness in the coated ferromagnetic particles affect the permeability and core loss characteristics of the composite magnetic article. The coating considered in this invention does not have magnetic permeability. Therefore, the permeability of coated ferromagnetic particles is expected to decrease with increasing coating thickness. The coating provides electrical insulation for individual ferromagnetic particles and better coating coverage results in lower eddy current losses. The coating coverage and coating thickness are measured using well-established stereological techniques developed by Gurland (J. Gurland, Trans AIME, Vol. 215, 1959, p.601). A suitable coating coverage is greater than about 75%. A coating thickness in the range from about 0.01 micrometers to about 1.5 micrometers is suitable. The weight fraction of the coating material in the coated ferromagnetic particle also affects the permeability and core loss characteristics. In one embodiment of the invention, the weight fraction of the coating material in the coated ferromagnetic particle is in the range of about 0.001 weight percent to about 2 weight percent of a total weight of the ferromagnetic core and the coating material. In a specific embodiment of the invention, the weight fraction of the coating material is in a range from about 0.05 weight percent to about 1 weight percent of a total weight of the ferromagnetic core and the coating material.

Transverse rupture strength of the composite magnetic article is an indicator of the mechanical strength of the article. The transverse rupture strength is defined as the stress required for breaking a simple beam specimen supported at the ends using a load applied to the beam at a point equidistant from the supports. Procedures for measuring the transverse rupture strength are described in ASTM B528-83a. In a specific embodiment of the invention, the transverse rupture strength of the composite magnetic article is greater than about 100 MPa. Procedures for measuring the permeability and core loss are described in ASTM A927M-94. In a specific embodiment of the invention, the permeability at a magnetic field of 1 Tesla and a frequency of 60 Hz is greater than about 250 while the core loss is less than about 35 W/kg.

A device of the present invention uses electromagnetic materials comprising the composite magnetic article. Such devices need high permeability and low core loss characteristics. Examples of such devices include, but are not limited to, stators, rotors, solenoids, cores for transformers, inductors, actuators, MRI pole faces, and MRI shims.

EXAMPLE

Iron powder (Ancorsteel 1000C) obtained from Hoeganaes Corporation (Cinnaminson, N.J.) was used as the ferromagnetic core material. A silicone (Grade YR 3370), in powder form, obtained from GE Bayer Silicones (Waterford, N.Y.) was used as the coating material. A predetermined amount of silicone was dissolved in xylene, used as a solvent, to form a solution. The weight fraction of the silicone was varied from about 0.125 weight percent to about 2.5 weight percent of a total weight of the silicone and the ferromagnetic core material. A predetermined weight of iron powder was dipped in the solution and the mixture was agitated. A rotavac apparatus (purchased from Heidolph, Germany) with a round bottom flask immersed in a temperature-controlled bath was used. The mixture was contained in the flask and the bath temperature was maintained between about 85° C. to about 95° C. The system was rotated while the content of the flask was subjected to a moderate vacuum of about 17,200 Pa (about 170 millibar). The solvent was vaporized leaving behind iron powder encapsulated by silicone.

The encapsulated powders were compacted into the shape of a ring, which had an outer diameter of about 3.5 cm, an inner diameter of about 2.5 cm and a thickness of about 0.76 cm. The compaction pressure used was about 760 MPa. The compact was heated to about 800° C. and annealed for a period of about 30 minutes at the same temperature. The compact was then cooled to room temperature. Some samples were annealed for a second time. After cooling to room temperature from about 800° C., these samples were reheated to about 500° C. and annealed for a period of about 30 minutes. The permeability and core loss were measured as per procedures described in ASTM A927M-94.

Table 1 below lists the weight fraction of silicone, the transverse rupture strength of the composite magnetic article, permeability, and core loss at a magnetic flux density of about 1 Tesla and a frequency of about 60 Hz. Results for iron powder without a coating are also shown. Samples subjected to a second annealing treatment are marked as double annealed.

TABLE 1

| Coating Weight Fraction (weight percent) | Transverse Rupture Strength (MPa) | Permeability at 1 Tesla and 60 Hz | Core Loss at 1 Tesla and 60 Hz (W/kg) |
|---|---|---|---|
| 0 (Iron powder with no coating) | 324 | 202 | 84.3 |
| 0 (Iron powder with no coating) | — | 202 | 83.7 |
| 0.125 | — | 294 | 26.4 |
| 0.125 (Double Annealed) | — | 413 | 24.9 |
| 0.25 | 187.5 | 341 | 30.7 |
| 0.25 (Double Annealed) | — | 317 | 29.8 |
| 0.5 | 210.5 | 305 | 33.9 |
| 1 | 153 | 127 | 34.8 |
| 1 (Double Annealed) | — | 154 | 42.8 |
| 2.5 | — | 54 | 52 |

While specific embodiments of the present invention have been disclosed in the foregoing, it will be appreciated by those skilled in the art that many modifications, substitutions, or variations may be made thereto without departing from the spirit and scope of the invention as defined in the appended claims.

What is claimed is:

1. A coated ferromagnetic particle comprising a ferromagnetic core and a coating, said coating consisting essentially of a residue resulting from a thermal treatment of a coating material consisting essentially of a polymer selected from the group consisting of polyorganosiloxanes, polyorganosilanes, and mixtures thereof.

2. The coated ferromagnetic particle of claim 1, wherein said ferromagnetic core comprises a material selected from the group consisting of Fe and Fe alloys.

3. The coated ferromagnetic particle of claim 2, wherein said ferromagnetic core has an average diameter in a range from about 10 micrometers to about 1 millimeter.

4. The coated ferromagnetic particle of claim 1, wherein said polymer comprises a silicone polymer.

5. The coated ferromagnetic particle of claim 1, wherein said coating material has a weight in a range from about 0.05 weight percent to about 1 weight percent of a total weight of said ferromagnetic core and said coating material.

6. A composite magnetic article comprising a compacted and annealed article of a desired shape comprising a plurality of coated ferromagnetic particles each comprising a ferromagnetic core and a coating, said coating consisting essentially of a residue resulting from a thermal treatment of a coating material consisting essentially of a polymer selected from the group consisting of polyorganosiloxanes, polyorganosilanes, and mixtures thereof.

7. The composite magnetic article of claim 6, wherein said ferromagnetic core comprises a material selected from the group consisting of Fe and Fe alloys.

8. The composite magnetic article of claim 7, wherein said ferromagnetic core has an average diameter in a range from about 10 micrometers to about 1 millimeter.

9. The composite magnetic article of claim 6, wherein said polymer comprises a silicone polymer.

10. The composite magnetic article of claim 6, wherein said coating material has a weight in a range from about 0.05 weight percent to about 1 weight percent of a total weight of said ferromagnetic core and said coating material.

11. A composite magnetic article comprising a compacted and annealed article of a desired shape comprising a plurality of coated ferromagnetic particles each comprising a ferromagnetic core and a coating, said coating comprising a residue resulting from a thermal treatment of a coating material comprising a polymer selected from the group consisting of polyorganosiloxanes, polyorganosilanes, and mixtures thereof, wherein said composite article has a transverse rupture strength greater than about 100 MPa.

12. The composite magnetic article of claim 11, wherein said composite magnetic article has a magnetic permeability greater than about 250 at a magnetic flux density of about 1 Tesla and a frequency of about 60 Hz.

13. The composite magnetic article of claim 11, wherein said composite magnetic article has a core loss of less than about 35 W/kg at a magnetic flux density of about 1 Tesla and a frequency of about 60 Hz.

14. A method for making a coated ferromagnetic particle, said method comprising the steps of:

a. providing an uncoated ferromagnetic core;

b. providing a coating material consisting essentially of a polymer selected from the group consisting of polyorganosiloxanes, polyorganosilanes, and mixtures thereof;

c. encapsulating said uncoated ferromagnetic core with said coating material; and d. thermally treating said coating material so as to convert said coating material into a residue;

to produce said coated ferromagnetic particle.

15. The method of claim 14, wherein said ferromagnetic core comprises a material selected from the group consisting of Fe and Fe alloys.

16. The method of claim 15, wherein said ferromagnetic core has an average diameter in a range from about 10 micrometers to about 1 millimeter.

17. The method of claim 14, wherein said polymer comprises a silicone polymer.

18. A method for making a coated ferromagnetic particle, said method comprising the steps of:

a. providing an uncoated ferromagnetic core;

b. providing a coating material comprising a polymer selected from the group consisting of polyorganosiloxanes, polyorganosilanes, and mixtures thereof;

c. encapsulating said uncoated ferromagnetic core with said coating material comprising said polymer; and d. thermally treating said coating material so as to convert said coating material into a residue;

to produce said coated ferromagnetic particle, wherein said coating material has a weight in a range from about 0.05 weight percent to about 1 weight percent of a total weight of said ferromagnetic core and said coating material.

19. The method of claim 14, wherein the step of thermally treating said coating material is performed at a temperature greater than about 250° C.

20. A method for producing a composite magnetic article, said method comprising the steps of:

a. providing uncoaated ferromagnetic particles;

b. providing a coating material consisting essentially of a polymer selected from the group consisting of polyorganosiloxanes, polyorganosilanes, and mixtures thereof;

c. encapsulating each of said uncoated ferromagnetic particles with said coating material to produce encapsulated ferromagnetic particles;

d. subjecting said encapsulated ferromagnetic particles to a compaction to form a compact of a desired shape; and e. subjecting said compact to an annealing treatment;

to produce said composite magnetic article, wherein said composite magnetic article comprises a plurality of coated ferromagnetic particles wherein each particle comprises a ferromagnetic core and a coating, said coating consisting essentially of a residue resulting from a thermal treatment of said coating material.

21. The method of claim 20, wherein said ferromagnetic core comprises a material selected from the group consisting of Fe and Fe alloys.

22. The method of claim 21, wherein said ferromagnetic core has an average diameter in a range from about 10 micrometers to about 1 millimeter.

23. The method of claim 20, wherein said polymer comprises a silicone polymer.

24. A method for producing a composite magnetic article, said method comprising the steps of:

a. providing uncoated ferromagnetic particles;

b. providing a coating material comprising a polymer selected from the group consisting of polyorganosiloxanes, polyorganosilanes, and mixtures thereof;

c. encapsulating each of said uncoated ferromagnetic particles with said coating material comprising said polymer to produce encapsulated ferromagnetic particles;

d. subjecting said encapsulated ferromagnetic particles to a compaction to form a compact of a desired shape; and e. subjecting said compact to an annealing treatment;

to produce said composite magnetic article, wherein said composite magnetic article comprises a plurality of coated ferromagnetic particles wherein each particle comprises a ferromagnetic core and a coating, said coating comprising a residue resulting from a thermal treatment of said coating material comprising said polymer, wherein said coating material has a weight in a range from about 0.05 weight percent to about 1 weight percent of a total weight of said ferromagnetic core and said coating material.

25. The method of claim 20, wherein said annealing treatment if performed at an annealing temperature greater than about 400° C.

26. The method of claim 25, wherein said annealing treatment is performed at said annealing temperature in a range from about 450° C. to about 950° C.

27. The method of claim 26, wherein said annealing treatment is performed for an annealing time in a range from about one minute to about ten hours.

28. The method of claim 24, wherein said annealing treatment comprises a first annealing treatment and a second annealing treatment wherein said first annealing treatment is performed at at least a first annealing temperature for a first annealing time followed by said second annealing treatment performed at at least a second annealing temperature for a second annealing time.

29. The method of claim 28, wherein said first annealing temperature is in a range from about 450° C. to about 950° C.; said first annealing time is in a range from about one minute to about ten hours; said second annealing temperature is in a range from about 300° C. to about 600° C.; and said second annealing time is in a range from about one minute to about fifty hours.

30. The method of claim 20, wherein said compaction is performed using a compaction pressure in a range from about 250 MPa to about 1300 MPa.

31. The method of claim 20, wherein said compact is subjected to a decomposition treatment prior to said annealing treatment.

32. The method of claim 31, wherein said compact is subjected to said decomposition treatment at a temperature of greater than about 250° C. for between about one minute and ten hours.

33. The method of claim 24, wherein said composite magnetic article has a transverse rupture strength greater than about 100 MPa.

34. The method of claim 24, wherein said composite magnetic article has a magnetic permeability greater than about 250 at a magnetic flux density of about 1 Tesla and a frequency of about 60 Hz.

35. The method of claim 24, wherein said composite magnetic article has a core loss of less than about 35 W/kg at a magnetic flux density of about 1 Tesla and a frequency of about 60 Hz.

36. The method of claim 20, wherein the step of encapsulating each of said uncoated ferromagnetic particles is done by a process selected from the group consisting of a dip coating process, a spray coating process, a fluidized bed coating process, and a precipitation coating process.

37. A device using electromagnetic materials comprising the composite magnetic article of claim 6.

38. The device of claim 37, selected from a group consisting of stators, rotors, solenoids, cores for transformers, inductors, actuators, MRI pole faces, and MRI shims.

* * * * *